US012686463B2

(12) United States Patent
Timan

(10) Patent No.: US 12,686,463 B2
(45) Date of Patent: *Jul. 21, 2026

(54) HIGH PERFORMANCE LIGHT WEIGHT VEHICLE FRAME

(71) Applicant: TimberWolf Cycles Inc., Sydenham (CA)

(72) Inventor: David J. Timan, Sydenham (CA)

(73) Assignee: TimberWolf Cycles Inc., Sydenham (CA)

( * ) Notice: Subject to any disclaimer, the term of this patent is extended or adjusted under 35 U.S.C. 154(b) by 1179 days.

This patent is subject to a terminal disclaimer.

(21) Appl. No.: 17/536,780

(22) Filed: Nov. 29, 2021

(65) Prior Publication Data

US 2022/0081058 A1 Mar. 17, 2022

Related U.S. Application Data

(63) Continuation of application No. 15/939,944, filed on Mar. 29, 2018, now Pat. No. 11,186,341.

(Continued)

(51) Int. Cl.
B62K 19/02 (2006.01)
B32B 5/12 (2006.01)
(Continued)

(52) U.S. Cl.
CPC ................ B62K 19/02 (2013.01); B32B 5/12 (2013.01); B32B 21/13 (2013.01); B62K 3/02 (2013.01);
(Continued)

(58) Field of Classification Search
CPC .......... B62K 19/02; B62K 19/14; B62K 3/02; B32B 5/12; B32B 21/13; B32B 2262/067;
(Continued)

(56) References Cited

U.S. PATENT DOCUMENTS 2,284,333 A 5/1942 Mcgirl
4,657,795 A 4/1987 Foret
(Continued)

FOREIGN PATENT DOCUMENTS

CA 2285726 A1 * 7/2000 ............... B32B 1/08
GB 2502468 A * 11/2013 ............. B62K 19/14
(Continued)

OTHER PUBLICATIONS

Merged original document (JP H06126005) with English Translation; Paragraphs added for citation purposes. (Year: 2026).*

(Continued)

*Primary Examiner* — John Olszewski
*Assistant Examiner* — Nathaniel William Watkins
(74) *Attorney, Agent, or Firm* — Stephen J. Scribner

(57) ABSTRACT

This invention relates to polygonal frame structures made from anisotropic materials, and methods for their construction. The polygonal frame structures include at least one frame member that is constructed as a torsion box. The torsion box is constructed with layers of anisotropic materials, resulting in a lightweight, torsionally stiff polygonal frame. Natural and/or man-made anisotropic materials may be used. Wood may be used as a natural anisotropic material. The invention is applicable to bicycles and other vehicles, as well as other products, where frame structures having light weight and torsional stiffness are advantageous.

18 Claims, 8 Drawing Sheets

Related U.S. Application Data

(60) Provisional application No. 62/479,618, filed on Mar. 31, 2017.

(51) Int. Cl.

| | | |
|---|---|---|
| B32B 21/13 | (2006.01) | |
| B62K 3/02 | (2006.01) | |
| B62K 3/04 | (2006.01) | |
| B62K 19/14 | (2006.01) | |

(52) U.S. Cl.
CPC ................ B62K 3/04 (2013.01); B62K 19/14 (2013.01); B32B 2262/067 (2013.01); B32B 2307/706 (2013.01)

(58) Field of Classification Search
CPC ........ B32B 2307/706; B32B 2260/046; B32B 7/03; B32B 21/08
USPC ....................................................... 280/281.1
See application file for complete search history.

(56) References Cited

U.S. PATENT DOCUMENTS

| | | | | |
|---|---|---|---|---|
| 4,828,285 | A | | 5/1989 | Foret |
| 5,016,895 | A | | 5/1991 | Hollingsworth |
| 5,215,322 | A | | 6/1993 | Enders |
| 5,451,071 | A | | 9/1995 | Pong |
| 5,624,519 | A | | 4/1997 | Nelson |
| 5,641,366 | A | | 6/1997 | Hohman |
| 5,685,553 | A | * | 11/1997 | Wilcox .................... B62K 3/10 |
| | | | | 280/281.1 |
| 5,853,651 | A | | 12/1998 | Lindsay |
| 6,109,638 | A | * | 8/2000 | Colegrove ............. B62K 19/16 |
| | | | | 280/281.1 |
| 6,270,104 | B1 | * | 8/2001 | Nelson ................... B62K 19/22 |
| | | | | 280/281.1 |
| 6,340,509 | B1 | | 1/2002 | Nelson |
| 6,655,707 | B2 | | 12/2003 | Buckmiller |
| 6,949,282 | B2 | | 9/2005 | Obeshaw |
| 7,543,835 | B2 | | 6/2009 | Murphy |
| 7,597,338 | B2 | * | 10/2009 | I .............................. B62K 19/16 |
| | | | | 280/281.1 |
| 8,286,974 | B2 | | 10/2012 | Chen |
| 2002/0061374 | A1 | * | 5/2002 | O'Brien ................. A63B 60/00 |
| | | | | 428/36.9 |
| 2006/0038375 | A1 | | 2/2006 | Parkin |
| 2006/0145029 | A1 | * | 7/2006 | Lonsinger ................. B64C 3/52 |
| | | | | 244/219 |
| 2009/0123770 | A1 | | 5/2009 | Melville |
| 2009/0218786 | A1 | | 9/2009 | Chuang |
| 2015/0375822 | A1 | * | 12/2015 | Gafni ....................... B31D 5/04 |
| | | | | 280/281.1 |
| 2016/0023311 | A1 | * | 1/2016 | Arbesman ............. B23P 15/246 |
| | | | | 29/432 |
| 2018/0333633 | A1 | | 11/2018 | Kelly |
| 2018/0345121 | A1 | | 12/2018 | Goehring, Jr. |

FOREIGN PATENT DOCUMENTS

| | | | | |
|---|---|---|---|---|
| WO | WO-2014103711 A1 | * | 7/2014 | ............ B29C 43/02 |
| WO | WO-2024100543 A1 | * | 5/2024 | .......... B32B 21/042 |

OTHER PUBLICATIONS

Renovo Hardwood Bicycles, printed material from website (2 pages).
BikePortland.org., "Out of cash and employees, Renovo calls it quits", online article, Bike Portland/Pedal Town Media, (5 pages), https://bikeportland.org.
Connor Wood Bicycles, printed material from website: http://connorcycles/com/ (5 pages).
Woodster Bikes, printed material from website: http://woodsterbikes/com (6 pages).
LJ Bicycles & Bespoke Carpentry in the Algarve, printed material from website: http://lj-woodworks.com (8 pages).
TimberWolf Cycles, printed material from website https://www/lightwoodenbicycles/com/ (4 pages).
Materia Bikes, printed material from website: http:/materiabikes.com/ (7 pages).

* cited by examiner

HIGH PERFORMANCE LIGHT WEIGHT VEHICLE FRAME

RELATED APPLICATION

This application claims the benefit of the filing date of Application No. 62/479,618, filed on Mar. 31, 2017, and is a continuation of application Ser. No. 15/939,944, filed on Mar. 29, 2018, the contents of which are incorporated herein by reference in their entirety.

FIELD

This invention relates to polygonal frame structures and methods for their construction. More specifically, the invention relates to lightweight, torsionally stiff polygonal frames made from anisotropic materials. The invention is applicable to bicycles and other vehicles, as well as other products, where frame structures having light weight and torsional stiffness are advantageous.

BACKGROUND

High performance bicycle frames ideally maximize rider efficiency while ensuring rider comfort. Rider comfort also influences rider efficiency by minimizing muscular fatigue. For a frame to be efficient, it requires high torsional stiffness while being lightweight. Torsional stiffness is generally considered between the head tube (HT) and the rear drop-outs (i.e., where the rear wheel is attached to the frame), as well as between HT and bottom bracket (BB). High torsional stiffness ensures desirable handling characteristics derived from the kinematics of steering inputs at high speed, as well as maximizes power transmission by minimizing frame deflection during pedalling. These handling characteristics include minimizing time delay between application of force at the pedal to the realization of tractive force at the rear wheel. In addition, torsionally compliant frames tend to enter a steering induced oscillation at high speed, such as may be encountered while descending a steep hill. Light-weight frame construction reduces rider power requirements for hill climbing, reduces power required to reach a given speed (i.e., provides faster acceleration), and reduces rolling resistance.

Rider comfort is influenced by the ability of the frame to deflect under impulses from road bumps, as well as the ability of the frame to absorb that deflection energy without transmitting it to the rider. Typically, high comfort bicycles introduce designated mechanical components to perform these functions: springs deflect under impulse, and fluid dampers absorb the deflection energy. Such components add both weight and complexity to a bicycle frame and as such are generally omitted from high performance bicycles. Some high performance bicycle manufacturers are currently attempting to introduce these features at a minimum weight, adding significant design complexity.

In most frame designs there is a trade-off between performance and rider comfort. In high performance bicycle frames, compliance is generally sacrificed in order to provide a frame that is torsionally stiff. This is driven by the desire to increase efficiency in high performance bicycles. Most high performance bicycle frame designs are made of fiber reinforced polymer (FRP), with the reinforcement generally being carbon fiber and the polymer generally being epoxy. Some high performance frames are alternatively made from welded metal tubes (e.g., aluminum, steel alloy, titanium). Aluminum frames generally exhibit high axial stiffness in their tubular members, resulting in a harsh ride. Steel alloy frames generally are less torsionally stiff than aluminum or FRP frames, but offer improved rider comfort. Titanium frames are very durable and highly compliant, but their low modulus of elasticity results in lower torsional stiffness. FRP frames offer high pedalling efficiency and can offer some level of rider comfort. With few exceptions, the trade-off between performance and rider comfort holds regardless of whether the frame material is steel alloy, aluminum, titanium, or FRP.

In addition to the mechanical performance of the frame described herein, the geometry of the frame also affects the ability of the rider to perform as desired. Each rider has different anthropometric measurements and as such requires specific frame geometry to maximise power output and comfort, and minimize muscular strain. Additionally, different cycling styles and activities benefit from rider positions which are tailored to the activity. More upright positions are preferable for urban riding where visibility in traffic and casual comfort are the primary concerns. For road racing or time trial sprinting, highly crouched positions minimize aerodynamic drag on the rider and increase available power at the pedals. Together these factors dictate the ideal frame geometry for the rider and their desired riding style. Frame manufacturers currently make a plethora of models and sizes to meet these diverse needs, typically requiring an extensive range of tooling. In order to minimize tooling, each model is generally limited to a small number of fixed sizes. Alternatively, some high performance frame manufacturers offer custom geometry at a high cost due to the extensive tooling and manufacturing requirements.

SUMMARY

According to one aspect of the invention, there is provided a polygonal frame; comprising: three or more frame members, at least one frame member comprising a torsion box; wherein the torsion box includes at least three panels and first and second ends; wherein each panel of the torsion box includes two or more layers of at least one anisotropic material; wherein the two or more layers of the at least one anisotropic material are alternatingly disposed at first and second selected grain direction angles relative to a longitudinal axis of the torsion box.

In one embodiment, the first selected angle and the second selected angle of at least one panel are substantially equal and opposite, relative to the longitudinal axis of the torsion box.

In one embodiment, the torsion box comprises a first pair of opposing panels and a second pair of opposing panels, each panel comprising two or more layers of at least one anisotropic material; wherein the two or more layers of the at least one anisotropic material of the first pair of panels and of the second pair of panels are alternatingly disposed at the first and second selected grain direction angles relative to a longitudinal axis of the torsion box.

In one embodiment, the two or more layers of the at least one anisotropic material of the first pair of panels are alternatingly disposed at the first and second selected grain direction angles relative to a longitudinal axis of the torsion box; and the two or more layers of the at least one anisotropic material of the second pair of panels are alternatingly disposed at third and fourth selected grain direction angles relative to a longitudinal axis of the torsion box.

In one embodiment, a number of layers of the at least one anisotropic material of the first pair of panels is different from a number of layers of the at least one anisotropic material of the second pair of panels.

In one embodiment, the two or more layers comprise at least two types of anisotropic materials.

In one embodiment, the at least one anisotropic material comprises a natural material.

In one embodiment, the at least one anisotropic material comprises wood.

In one embodiment, the two or more layers comprise at least two species of wood.

In one embodiment, at least one layer of the two or more layers comprises a man-made anisotropic material and at least one other layer of the two or more layers comprises a natural anisotropic material.

In one embodiment, each frame member of the polygonal frame comprises a torsion box.

In one embodiment, at least one frame member of the polygonal frame is a first torsion box and at least a second frame member of the polygonal frame is a second torsion box; wherein: (i) the first torsion box includes at least one anisotropic material that is different from anisotropic materials included in the second torsion box; or (ii) the first torsion box includes at least one anisotropic material that is disposed at a first selected grain direction angle relative to its longitudinal axis, and the second torsion box includes at least one anisotropic material that is disposed at a second selected grain direction angle relative to its longitudinal axis; or (iii) both (i) and (ii).

In one embodiment, the polygonal frame is the main triangle of a bicycle frame.

Another aspect of the invention provides an apparatus for constructing a polygonal frame, comprising: a set of tool elements that register with individual frame members and define a set of selected angles between adjacent frame members of the polygonal frame; a substrate that supports the set of tool elements, wherein positions of the tool elements on the substrate are adjustable; wherein adjustment of the positions of the tool elements on the substrate provides scaling of the polygonal frame while maintaining the selected angles between adjacent frame members.

In one embodiment, the set of tool elements registers with surfaces of the individual frame members that correspond to an inside of the polygonal frame.

In one embodiment, each tool element has a locking mechanism that locks the tool element in a selected position.

In one embodiment, one or more backing blocks register with one or more surfaces of the individual frame members that correspond to an outside of the polygonal frame.

In one embodiment, a tool element and a backing block are adapted for clamping a frame member therebetween.

In one embodiment, the set of tool elements comprises a set of selected angles corresponding to the main triangle of a bicycle frame.

Another aspect of the invention provides a method for constructing a polygonal frame; comprising: providing at least three frame members, at least one frame member comprising a torsion box; wherein at least one torsion box includes at least three panels and first and second ends; wherein each panel of the at least one torsion box includes two or more layers of at least one anisotropic material; the method including alternatingly disposing the two or more layers of the at least one anisotropic material at first and second selected grain direction angles relative to a longitudinal axis of the torsion box.

In one embodiment, the polygonal frame comprises three frame members and each frame member comprises a torsion box; wherein each torsion box comprises a first pair of opposing panels and a second pair of opposing panels, each panel comprising two or more layers of at least one anisotropic material; the method comprising: alternatingly disposing the two or more layers of the at least one anisotropic material of the first pair of panels and of the second pair of panels at the first and second selected grain direction angles relative to longitudinal axes of the torsion boxes.

In one embodiment, the method comprises alternatingly disposing the two or more layers of the at least one anisotropic material of the first pair of panels at the first and second selected grain direction angles relative to the longitudinal axes of the torsion boxes; and alternatingly disposing the two or more layers of the at least one anisotropic material of the second pair of panels at third and fourth selected grain direction angles relative to the longitudinal axes of the torsion boxes.

In one embodiment of the method, a number of layers of the at least one anisotropic material of the first pair of panels is different from a number of layers of the at least one anisotropic material of the second pair of panels.

In one embodiment of the method, at least one frame member of the polygonal frame is a first torsion box and at least a second frame member of the polygonal frame is a second torsion box; wherein: (i) the first torsion box includes at least one anisotropic material that is different from anisotropic materials included in the second torsion box; or (ii) the first torsion box includes at least one anisotropic material that is disposed at a first selected grain direction angle relative to its longitudinal axis, and the second torsion box includes at least one anisotropic material that is disposed at a second selected grain direction angle relative to its longitudinal axis; or (iii) both (i) and (ii).

In one embodiment of the method, the two or more layers comprise at least two types of anisotropic materials.

In one embodiment of the method, the at least one anisotropic material comprises a natural material.

In one embodiment of the method, the at least one anisotropic material comprises wood.

In one embodiment of the method, the two or more layers comprise at least two species of wood.

In one embodiment of the method, at least one layer of the two or more layers comprises a man-made anisotropic material and at least one other layer of the two or more layers comprises a natural anisotropic material.

In one embodiment of the method, each frame member of the polygonal frame comprises a torsion box.

In one embodiment, the method comprises using the apparatus described herein to construct the polygonal frame.

In various embodiments of the method, the polygonal frame comprises the main triangle of a bicycle frame.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
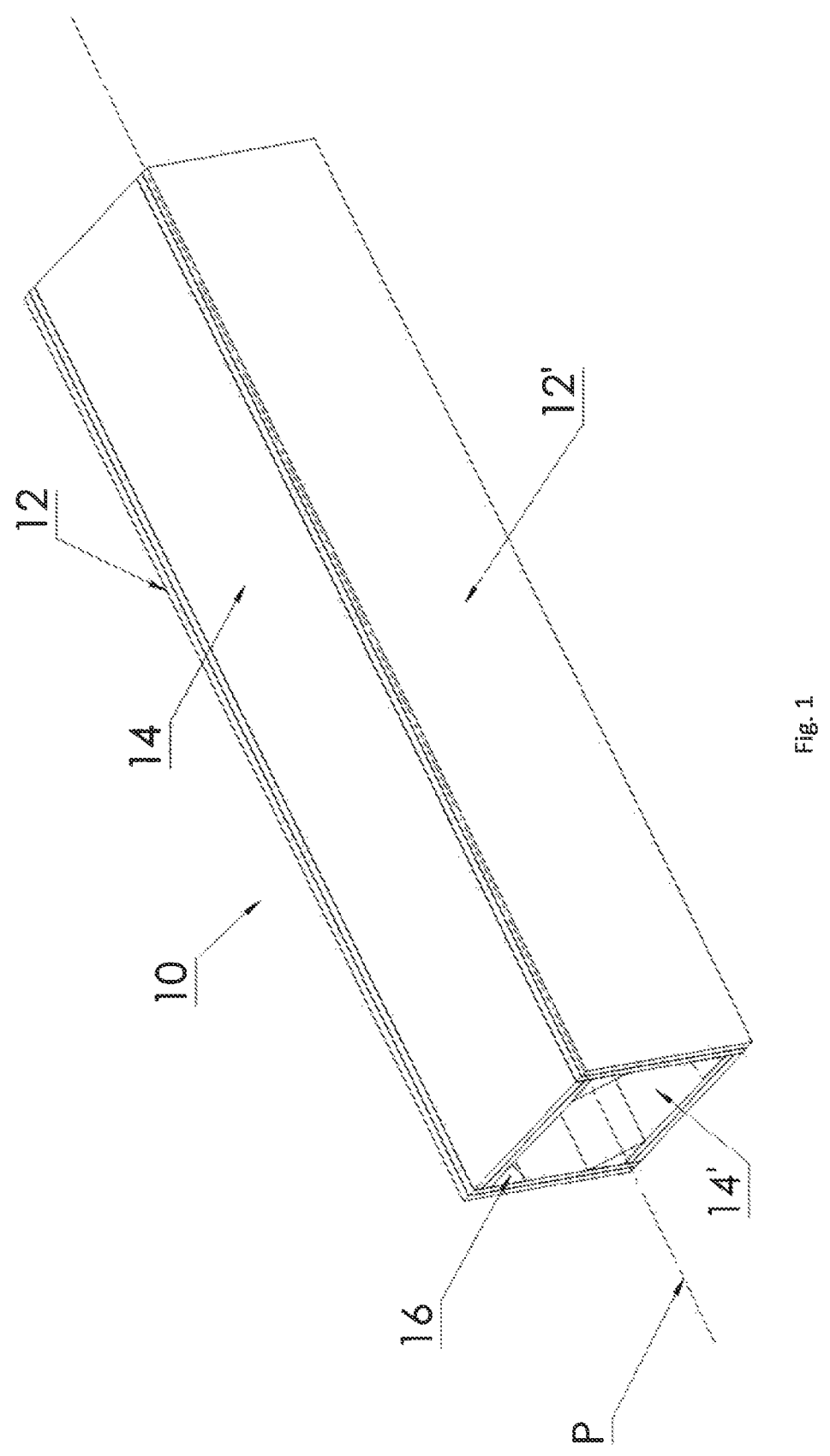
FIG. 1 is a diagram of a torsion box, according to one embodiment.

According to a broad aspect, this invention provides lightweight, torsionally stiff polygonal frame structures and methods for their construction, using anisotropic materials. An example of an application of a polygonal frame as described herein is a bicycle frame, although it will be appreciated that the field of this invention is not limited thereto. Other fields, such as aerospace, require lightweight torsionally stiff structures in order to avoid aeroelastic instabilities. In particular, unmanned vehicles such as small scale drones is becoming a large industry and the concepts and methods described herein may be applied to such technology in the construction of airframes. Other vehicle frame structures would derive similar benefits. The constructs and methods of the invention expand the options available to a designer to obtain a desired torsional stiffness without limiting the ability to obtain a desired axial stiffness, bending stiffness, and/or low weight.

The term "anisotropic" as used herein is given its ordinary meaning in the art; that is, it refers to material having a physical property that has a different value when measured in different directions (e.g., axes). An example of an anisotropic material is wood, which has different (greater) strength and stiffness in the direction of its grain than in a direction across its grain. Thus, in the case of wood, the grain direction is the strongest anisotropic axis.

In the embodiments described herein, wood is principally used as the anisotropic material. Wood is desirable for several reasons, including having physical properties of strength, stiffness, density, and intrinsic damping that are well understood and well-suited to bicycle frame construction, as well as being relatively inexpensive, renewable, easy to machine, durable, and aesthetically pleasing. Furthermore, wood species vary in the above-mentioned properties, providing opportunities to fine-tune frame components by selecting appropriate species, or combinations of species. The differences in these properties also results in differences in the natural frequencies transmitted by polygonal structures made from them. As described herein, layers of different wood species may be bonded to one another to provide a polygonal frame that cancels or dampens a wide spectrum of frequencies, minimizing vibrations.

It will be appreciated that the invention is not limited to wood, since the structures and construction methods may be implemented using other anisotropic materials. For example, other natural anisotropic materials, such as bamboo or hemp, and man-made anisotropic materials, such as fiber reinforced polymer, may be used. The term "grain direction" as used in this disclosure may also be applied to such man-made materials, where the grain direction is the strongest anisotropic axis. As described herein, different types of anisotropic materials, including natural and man-made anisotropic materials, may be combined in layers of polygonal frame members. The differences in the properties of the different materials also results in differences in the natural frequencies transmitted by polygonal structures made from them. As described herein, layers of different anisotropic materials may be bonded to one another to provide a polygonal frame that dampens or cancels a wide spectrum of frequencies, minimizing vibrations.

Thus, one aspect of the invention relates to a polygonal frame made, at least partially, of anisotropic material, the structure having high torsional stiffness, axial compliance, and light weight. The frame has at least three members, which are joined at their ends such that the frame shape is triangular. Other polygonal frame shapes may of course be constructed using more members. At least one member of the polygon is constructed as a torsion box. As used herein, the term "torsion box" refers to a box having sides made of thin layers of anisotropic material over a lightweight core, designed to resist torsion under an applied load. The core may be hollow, and may contain internal struts, blocking, and/or bulkheads. The frame members may be referred to herein as a "tubes". The members may have a square or quadrilateral cross-section. However, other cross-sections may be used (e.g., trapezoidal), and members may be other than four-sided (e.g., three, five, six, etc. sides). Four-sided torsion boxes are advantageously easier to build since all longitudinal joinery is substantially at 90 degrees.

Further details of torsion boxes according to embodiments of the invention will now be described. For the purpose of this description, each side of a torsion box is referred to as a "panel". FIG. 1 shows a torsion box 10 having a quadrilateral cross-section, with two pairs of opposing panels 12, 12' and 14, 14' and corner blocking 16. The primary or longitudinal axis ID of the torsion box is shown. The pairs of panels 12, 12' and 14, 14' may be of the same or different construction. The panels of each torsion box are constructed from two or more layers of an anisotropic material. The layers are selectively arranged according to their strongest anisotropic axes, and according to the longitudinal axis of the tube, to produce a tube with desired strength, stiffness, and flexibility. For example, two or more layers of anisotropic material may be arranged such that the axes of highest strength are oriented at alternating angles to the primary (longitudinal) axis of the tube. Bulkheads may also be used in the construction of a torsion box. A bulkhead may be shaped according to the inside cross-section of the torsion box. The bulkheads hold the corner blocks and panels in place during construction (e.g., gluing), and also transfer shear stress, which increases torsional stiffness.

Figure 2:
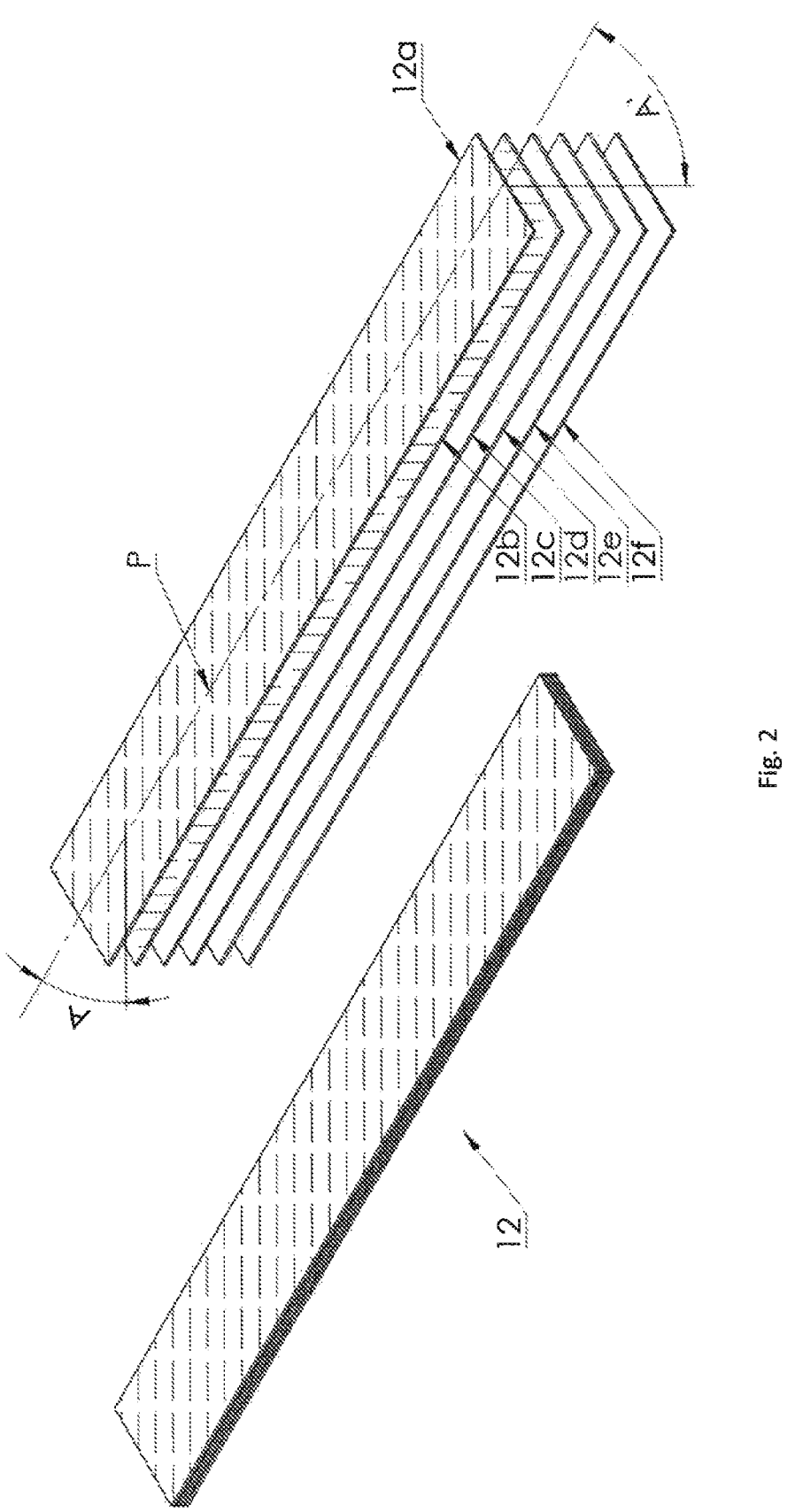
FIG. 2 is a diagram showing construction of a panel of a torsion box, according to one embodiment.

FIG. 2 shows a panel 12. In the exploded view (right) it can been seen that the panel has six layers 12a-12f of anisotropic material, wherein the dashed lines represent the grain direction (i.e., strongest anisotropic axis) of the material. The grain directions of the layers are arranged at alternating angles A, A' to the primary axis P of the torsion box. For clarity, the grain directions for only the first two layers 12a, 12b, are shown in FIG. 2. It will be appreciated that A and A' need not be identical angles.

As generally understood, a rectangular torsion box as described above when loaded in torsion will exhibit torque as shear stress in each of the panels. If the loading is purely torque and no bending or axial loads are applied, this shear will exhibit as principal stresses at 45 degrees to the primary axis P of the tube in both directions. The same torsion box if loaded with a purely axial force will exhibit this as principal stresses along the primary axis P of the torsion box. A torsion box constructed from an anisotropic material with grain directions A, A' at a high angle up to 45 degrees to the primary axis P will exhibit high torsional stiffness, and low associated axial stiffness. A grain direction at 45 degrees to the primary axis P will therefore exhibit the highest possible torsional stiffness and lowest associated axial stiffness for a reasonable configuration for high performance frames. Likewise, a torsion box constructed with grain orientation parallel to the primary axis P of the torsion box or at a low angle to the primary axis P will exhibit the highest axial stiffness and lowest associated torsional stiffness. Thus, in accordance with the invention, a grain angle may be selected which best suits the desired combination of axial and torsional tube properties. For example, a grain direction A, A' of about 30 degrees to the primary axis P, as compared to about 45 degrees, would be less stiff torsionally but more stiff axially. Therefore, grain direction angles A, A' may be selected to achieve desired torsional and axial stiffness. In addition to stiffness, tensile strength of the torsion box must also be considered and the choice of grain direction also affects this. It will be appreciated that angles A and A' between the primary axis P and the grain direction of the layers may also be greater than 45 degrees (such as, for example, 50, 60, 70, or 80 degrees), since such angles may be used to increase axial compliance and torsional compliance if desired.

Figure 3:
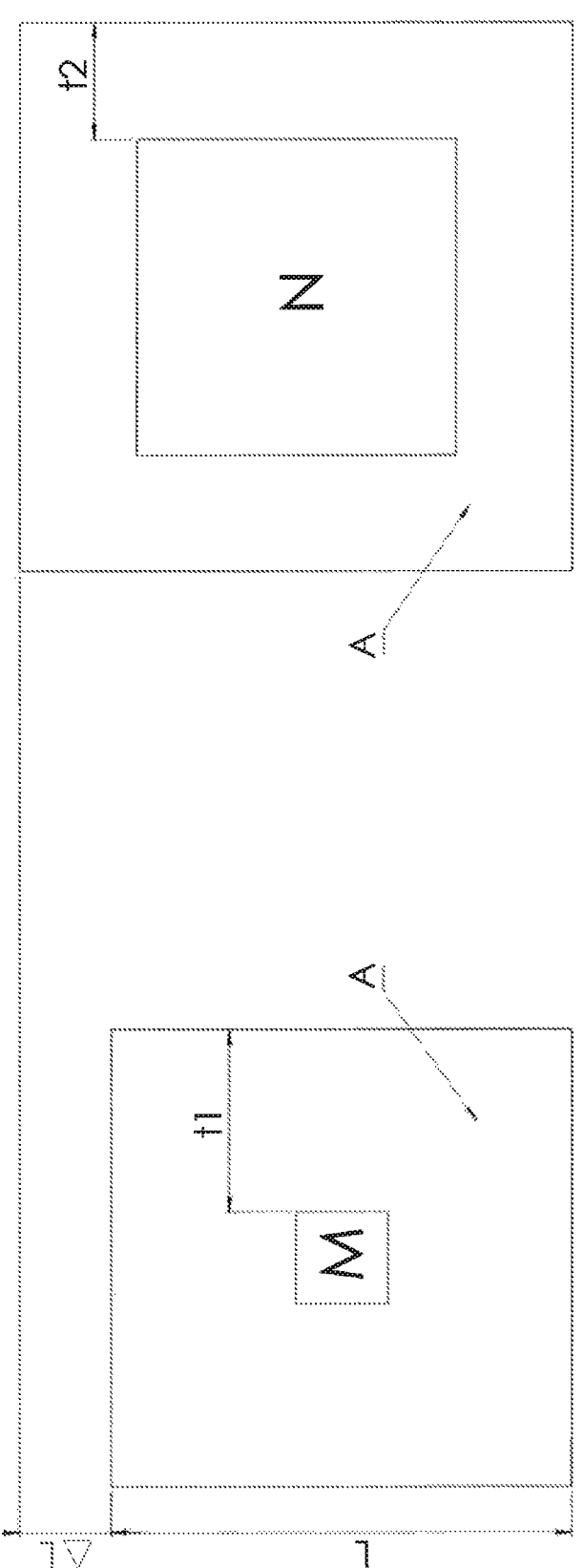
FIG. 3 is a diagram showing a relationship between torsion box size and wall thickness as it pertains to material density.

To build a polygonal frame having high torsional stiffness, low axial stiffness, and light weight, anisotropic materials that have both a high strength-to-weight ratio and low density are selected. Strength-to-weight ratio is generally considered as the ratio of allowable yield stress to material density. A high strength-to-weight ratio permits lightweight structures to handle high loads. In FIG. 3, two examples torsion boxes M and N are shown in cross-section. Torsion box M has dimension L, wall thickness t1, and a cross sectional area A, and torsion box N has dimension L plus ΔL, wall thickness t2, and the same cross sectional area A. Both of these torsion boxes have identical axial stiffness, but box N has a higher torsional stiffness. This effect suggests that walls of torsion boxes should be as thin as possible, but there is a practical limit introduced by manufacturing constraints, resistance to localized buckling, and resistance to damage, resulting in a minimum value of thickness 't'. Lower density materials exhibit the same axial stiffness with a higher cross sectional area, resulting in higher thickness 't' for a given torsional stiffness.

In addition to selecting the grain direction of an anisotropic material, a material may be selected for its natural dampening properties, which may be described by the hysteresis of the material. For example, a torsion box of a polygonal frame as described herein may be made with layers of a material having a high mechanical hysteresis, which absorbs energy introduced into the material through elastic strain. In some embodiments, a torsion box of a polygonal frame may be constructed with layers of different materials having high mechanical hysteresis which absorb energy introduced through elastic strain. When the layers are bonded together, the natural frequency of one layer of material acts to destructively interfere with the natural frequency of another layer. This effect may be used to further dampen the vibrations transmitted through a polygonal frame built in this way.

In accordance with these design criteria, a polygonal frame may be constructed of frame members wherein each frame member has the same characteristics, or wherein at least one frame member has different characteristics than the other frame members, or wherein all frame members have different characteristics, wherein the characteristics include torsional stiffness and axial stiffness.

Further details are described herein in respect of the main triangle of a bicycle frame. However, as noted above, the invention is not limited to such a structure as the constructs and methods are broadly applicable to other fields, such as, but not limited to, automotive, aeronautical, and nautical.

Figure 4:
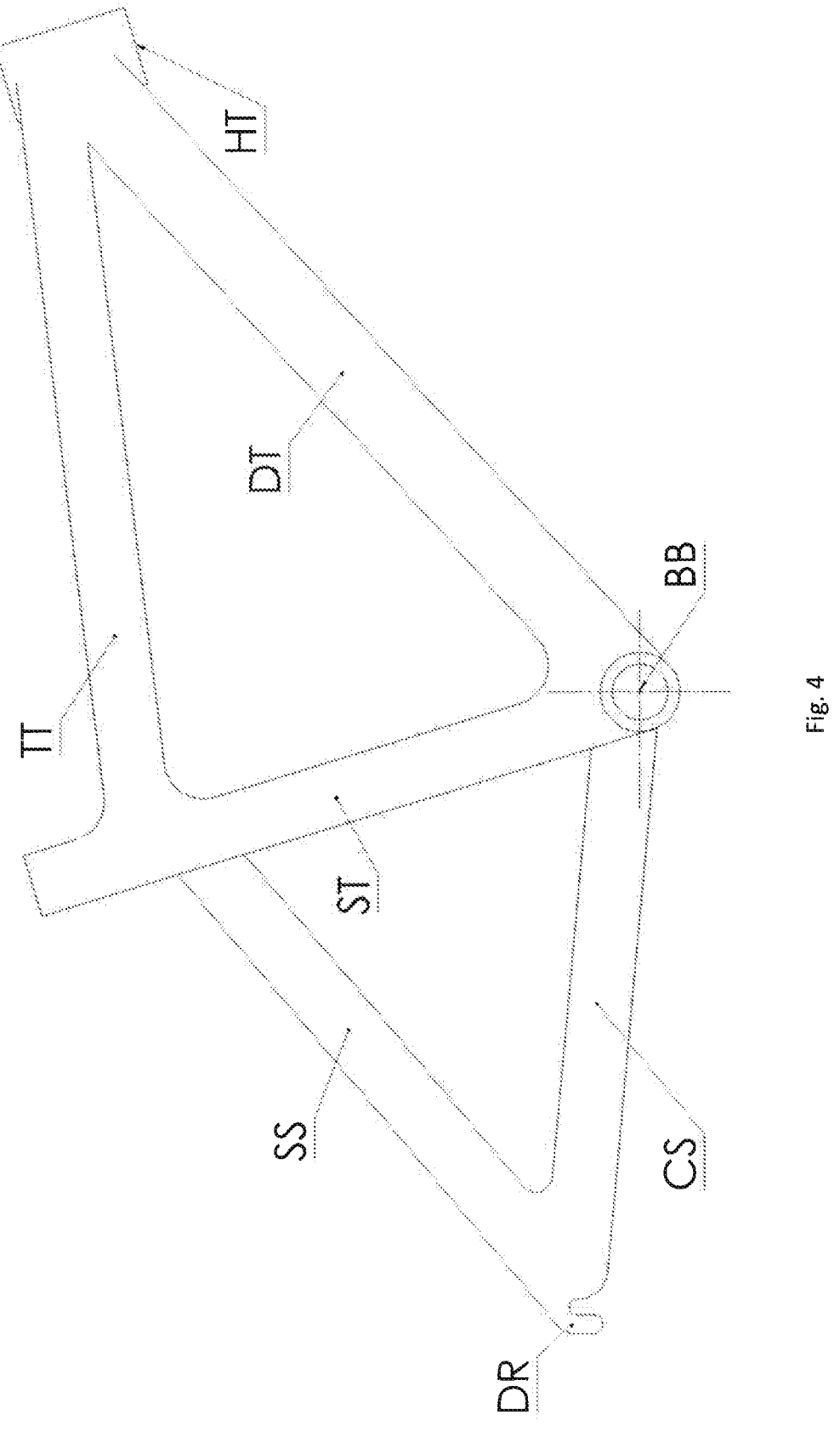
FIG. 4 is a diagram showing main elements of a bicycle frame.

The constructs and methods described herein address the shortcomings of prior high performance bicycle frames by providing frames that are efficient while not sacrificing comfort for the rider. The use of anisotropic materials for the frame members results in a frame that provides increased torsional stiffness with decreased axial stiffness, as well as increased vibration damping which improves rider comfort and reduces fatigue. These improvements are made in such a way that a low overall weight of the frame is achieved. A bicycle frame is shown in FIG. 4. Referring to FIG. 4, the frame includes a main triangle formed by three members: the seat tube ST, the top tube TT, and the down tube DT. The down tube DT and the seat tube ST are joined at the bottom bracket shell BB. The down tube DT and the top tube TT are joined at the head tube HT. The seat tube ST may be reinforced where it is joined to the top tube TT, to accept a seat post (not shown). A second triangle is formed by the seat tube ST, the seat stays SS, and the chain stays CS. The seat stays SS are joined at first ends to the seat tube ST near its junction with the top tube TT. The chain stays CS are joined at first ends to the bottom bracket shell BB. Second ends of the seat stays SS and second ends of the chain stays CS are joined at rear dropouts DR (only one is shown) to which the rear wheel is secured. A front fork (not shown) is secured to the head tube HT. An important design consideration is the dynamic orientation of the bottom bracket BB with respect to the head tube HT. Specifically, high torsional stiffness between the bottom bracket BB and the head tube HT is required to maximize efficiency of the frame. High torsional stiffness between the rear dropouts DR and bottom bracket BB is also required for high efficiency. In addition, high torsional stiffness in these areas minimizes chain line misalignment which could cause the gears to skip under high load.

Figure 5:
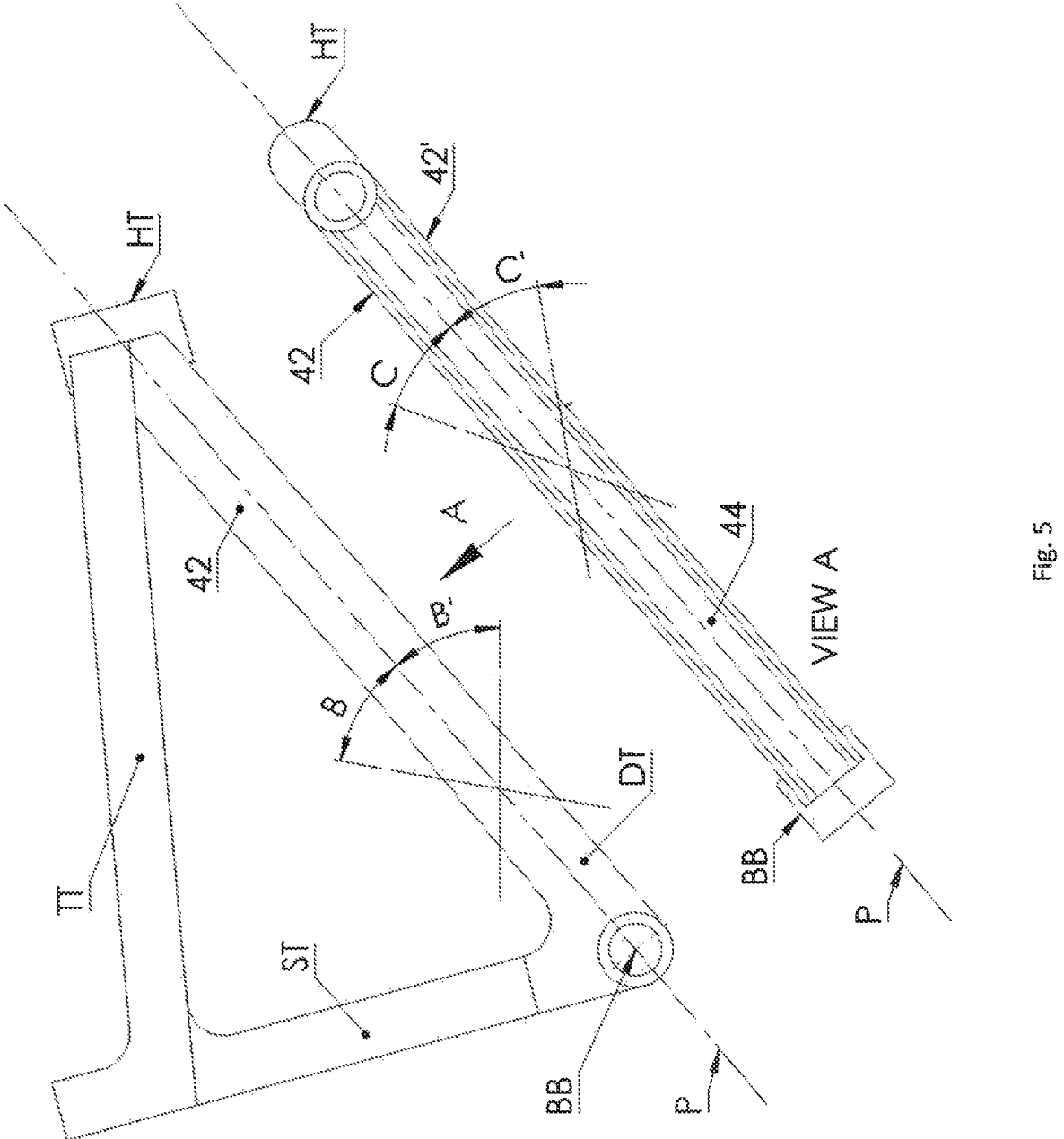
FIG. 5 is a diagram showing construction of a bicycle frame, according to one embodiment.

With reference to FIG. 5, one or more of the top tube TT, seat tube ST, and down tube DT of the main triangle may be torsion boxes constructed with four panels as described above. Other torsion box configurations may of course also be used. Each of the panels includes at least two layers of anisotropic material. As described above, the panels of the torsion boxes are assembled from layers of anisotropic material such that grain directions are alternatingly angled substantially symmetrically about the longitudinal axis P of the frame member. As an example, FIG. 5 shows details of the down tube DT constructed as a torsion box. Referring to FIGS. 5, B and B' indicate alternating grain direction orientation of two or more layers of anisotropic material for each of the opposing panels 42 and 42' of the down tube DT. In view A, C and C' indicate alternating grain direction orientation of two or more layers of anisotropic material for each of the opposing panels 44 and 44'(not shown) of the down tube DT. The panels 42, 42', 44, 44' may be assembled to form the torsion box by gluing abutting edges, optionally corner blocks 16, as shown in FIG. 1, and/or bulkheads. The corner blocks 16 and bulkheads transfer shear stress from one side to the next, which increases torsional stiffness. The torsion boxes for the seat tube ST and top tube TT may be constructed the same way as the down tube DT. However, for each torsion box, variables such as the selection of one or a combination of anisotropic materials, the number of layers of the anisotropic material(s), and the grain directions of the anisotropic materials) may be tailored according to specified characteristics of the frame. These variables may be selected to provide relative differences in torsional and axial stiffness between the three members of the main triangle. For example, the variables may be selected to provide a frame wherein torsional stiffness of the DT is greatest, and axial stiffness of the ST is lowest. Such a frame maximizes pedalling efficiency while maintaining rider comfort.

Another aspect of the invention relates to a method for constructing a polygonal frame, wherein one or more frame members is a torsion box, the method providing for the construction of different sizes of frames while maintaining a specified angular relationship among the frame members. Construction may begin with prefabricated panels to be assembled as torsion boxes. The method is described in detail with respect to the construction of the main triangle of a bicycle frame, and it can easily be adapted to other polygonal frames having more than three frame members.

Figure 6:
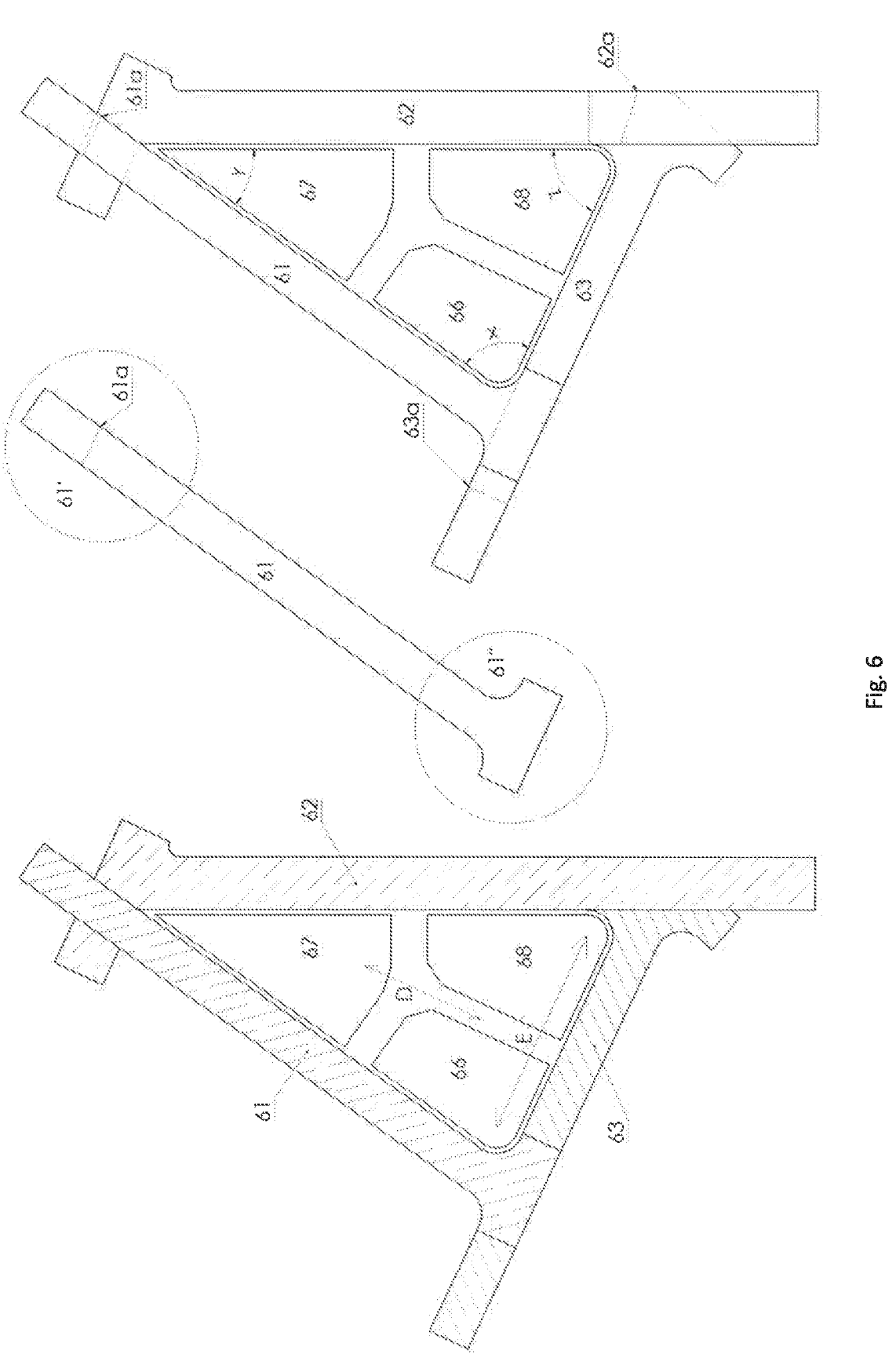
FIG. 6 is a diagram showing a tool set used in the construction of a polygonal frame, according to one embodiment.
Figure 7:
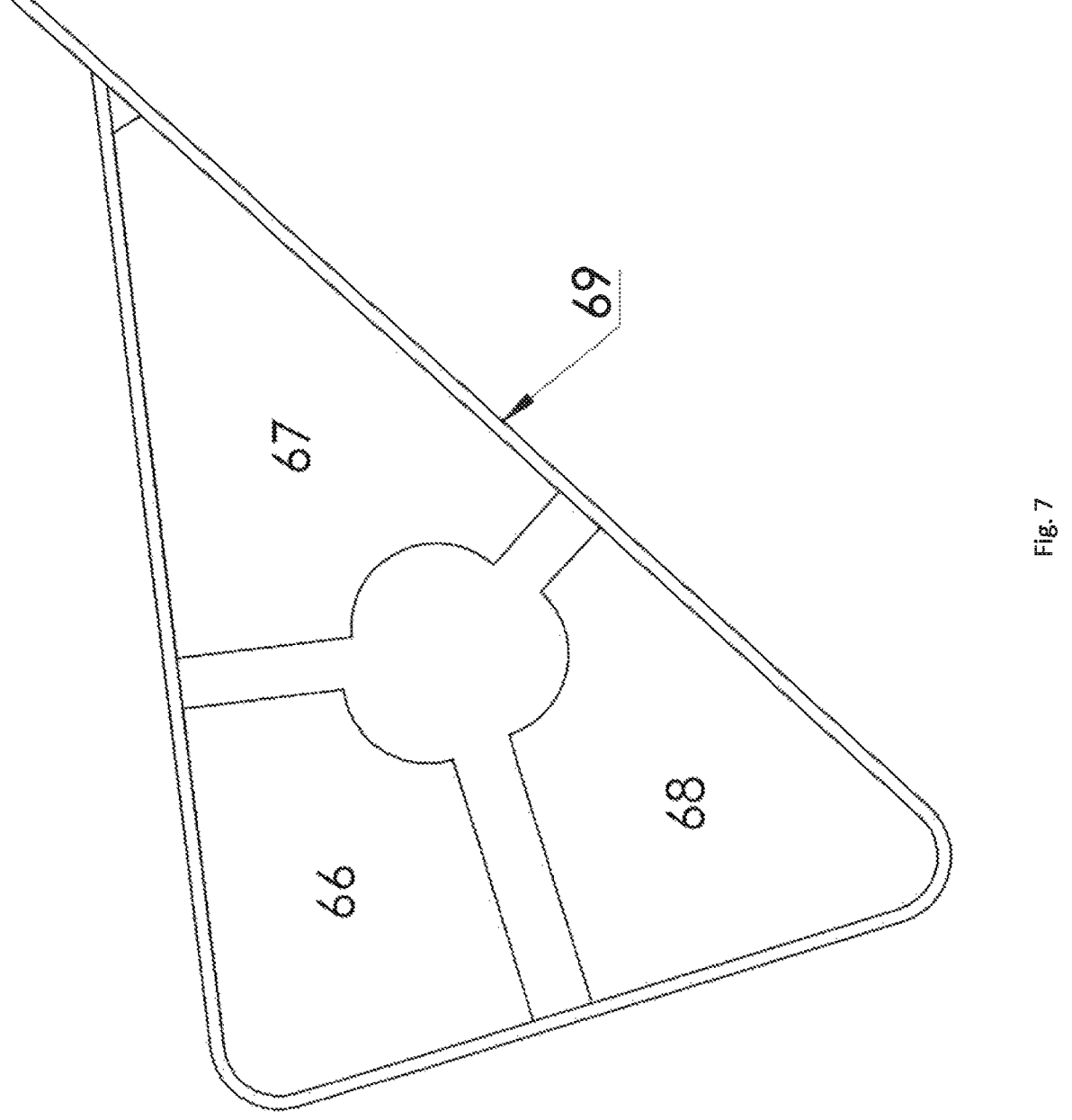
FIG. 7 is a diagram showing an optional step in the construction of a polygonal frame as shown in FIG. 6, according to one embodiment.

FIG. 6 shows a set of three panels 61, 62, 63, corresponding to the top tube TT, down tube DT, and seat tube ST, respectively, of the main triangle of a bicycle frame. Each of these panels is one panel of a pair that become two opposing sides of a torsion box. Each panel has a complex end and a simple end. For example, panel 61 for the top tube TT is shown separately in FIG. 6 with the complex end 61″ and the simple end 61′ circled, so that they can be seen clearly. The complex end of each panel 61, 62, 63 is uniquely shaped according to its unique corner of the main triangle. Each panel is prepared with excess length at the simple end, so that it may be cut to final size. FIG. 6 also shows a set of three tool elements 66, 67, 68 that are movably associated with a substrate (not shown). The tool elements set the angles X, Y. Z of the polygon and are movable in the plane of the polygon, and are used to set the size of the polygonal frame to be made. Movement of the tool elements 66, 67, 68 is guided by their association with the substrate such that movement of elements 66 and 68 in either direction E is coordinated with movement of element 67 in either direction D, so as to maintain alignment of the tool elements 66, 67, 68 and the angles X, Y, Z of the polygon. Once a polygon size has been selected, the tool elements 66, 67, 68 are fixed in place and the simple ends of the panels 61, 62, 63 are marked for cutting. For example, FIG. 6 shows a cut line 61a where the panel 61 for the top tube TT is to be cut, and cut lines 62a and 63a for the down tube DT and seat tube ST, respectively. Once each of these panels has been cut, the opposing panels for each of the top tube TT, down tube DT, and seat tube ST may be cut. Remaining panel pairs (not shown) that are required to complete each torsion box are then prepared. The polygonal frame is then assembled from all panels, optionally with corner blocks and/or bulkheads inside the torsion boxes, by gluing and clamping the frame between the tool elements 66, 67, 68 and corresponding backing blocks (not shown). Optionally, as shown in FIG. 7, a layer or multiple layers of one or more manmade or natural materials 69 may be added to the inside face of the frame (i.e., inserted between the tool elements 66, 67, 68 and constitutes one panel of the top tube TT, down tube DT, and seat tube ST torsion boxes) during assembly. Although it is preferred that, to maximize strength, such a layer of material 69 be continuous, it not essential and can include more or less sides of the polygon. One or more additional layers may be added to the frame at selected locations for one or more of increasing strength/stiffness, completing transitions, and aesthetic appeal. For example, the torsion box frame members may be covered with a layer of a material with rain direction parallel to the primary axis of each member, to selectively increase axial stiffness. Further construction steps relating to addition of the head tube HT, bottom bracket BB, seat post mount, and rear triangle are not described here.

Figure 8:
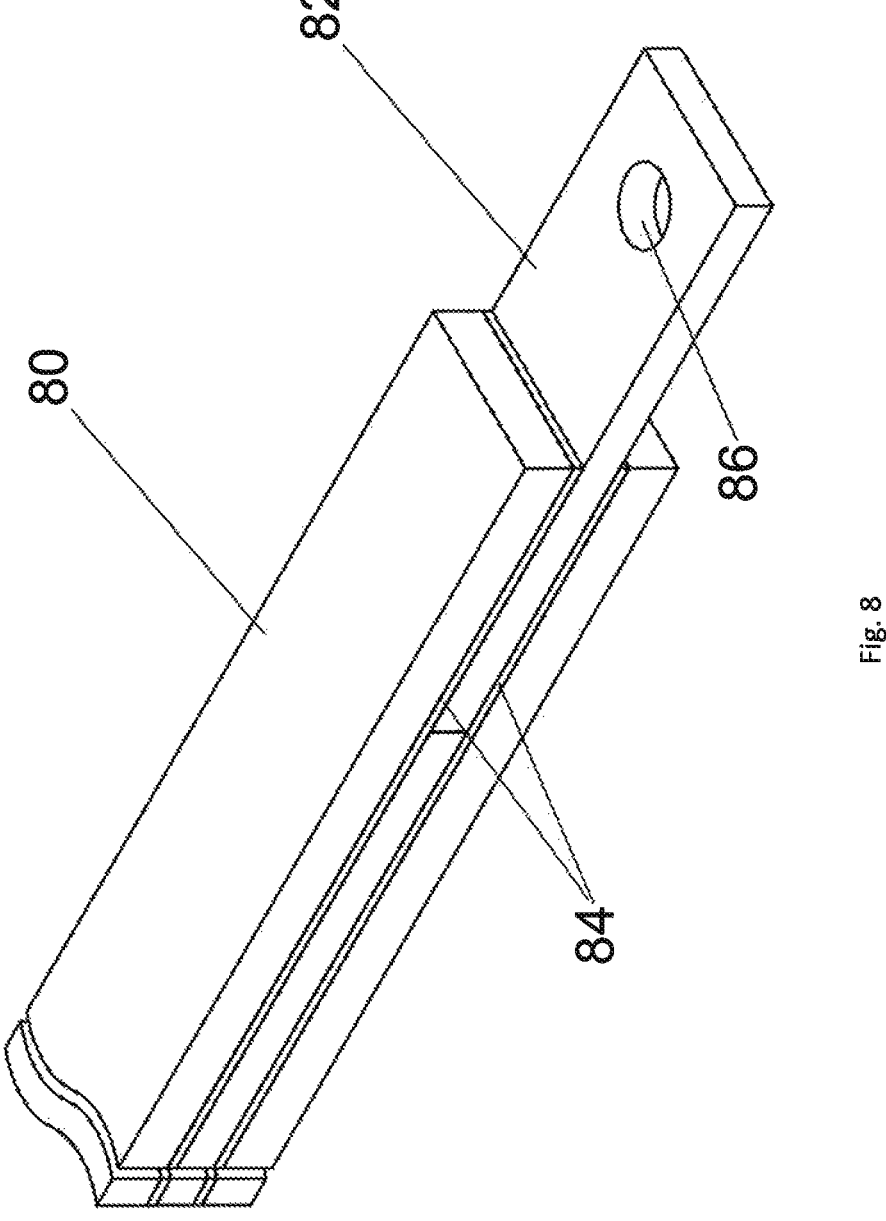
FIG. 8 is a diagram showing incorporation of a high stress component into a polygonal frame, according to one embodiment.

Also described herein is an approach for incorporating high stress components into a polygonal frame. Such high stress components may include, for example, components that are inserted into the frame, such as pressed bearings, bushings, sleeves, etc., and components are attached to the frame, such as mounts, brackets, studs, etc., for accepting parts that are connected to the frame using bolts, screws, clamps, and the like. To manage the pressing and/or clamping forces in such a high stress location, the high stress component may be made from a high density, high strength material such as, for example, aluminum or titanium, and is bonded to or otherwise incorporated into the frame at the location. Referring to the example of a bicycle frame, a "dropout" for mounting a wheel is such a high stress component due to the high linear shear. High stress components may also be used in other locations where high compression and tension are developed, including the bottom bracket and head tube. However, if a high stress component is bonded directly to the lower density material of the polygonal frame, stress concentrations may develop due to differences in deflection of the two materials at the same stress. In order to avoid stress concentrations, one or more material of intermediate density and stiffness (i.e., between that of the high stress component and the frame) may be incorporated into the frame where the high stress component is located. This provides a stiffness gradient which alleviates the stress concentration. For example, FIG. 8 shows a portion of a frame 80 into which a high stress component 82 is incorporated. A material of intermediate density and stiffness 84 is used between the high stress component 82 and the frame material 80. The high stress component 82 may have a through-hole 86 or other feature to facilitate attachment of a part thereto. The material of intermediate density may be, for example, a carbon reinforced epoxy composite.

The methods and structures described herein provide for the construction of a polygonal frame, wherein at least one frame member is a torsion box, wherein the size of the polygonal frame may easily be adjusted. For example, adjusting the size of a polygonal frame may include scaling the size, which maintains a selected geometrical arrangement of the frame members. The methods and constructs may be used in the construction of the main triangle of a bicycle frame, and provide for a range of sizes of frames and for unique sizing of frame members, for custom fitting to riders. This permits minute adjustments in frame size without the need for costly unique tooling for each specific frame size. For example, a range of frame sizes from ~48 cm to ~56 cm may be constructed with a given tool set (i.e., 66, 67, 68). Other tool sets may have different geometries (i.e., different sets of angles X, Y, Z) to permit construction of other, potentially overlapping, ranges of frame sizes, such as, for example, ~44 cm to ~50 cm frames, ~52 cm to ~60 cm frames, etc. Thus, lightweight, high-performance bicycle frames covering a broad range of frame sizes may be constructed with a minimum of tooling, with rapid, low cost construction methods. The methods and constructs described herein avoid the need for costly automated tooling, and high volumes of waste material.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A vehicle frame member, comprising:

at least three panels joined together in an arrangement that provides a hollow tube;

each panel of the at least three panels comprising two or more layers of material characterized by values of strength and stiffness along a first axis that are different from values of strength and stiffness along a second axis, high strength to weight ratio, and density of wood;

wherein the two or more layers of material of each panel are alternatingly disposed with the first axis oriented at different selected angles relative to a longitudinal axis of the vehicle frame member, and with the second axis oriented at different selected angles relative to the longitudinal axis of the vehicle frame member;

wherein the vehicle frame member exhibits a selected higher torsional stiffness along the longitudinal axis and a selected lower associated axial stiffness along the longitudinal axis according to the selected orientations of the first and second axes of the material.

2. The vehicle frame member of claim 1, wherein the selected angle of the first axis and the selected angle of the second axis are substantially equal and opposite, relative to the longitudinal axis of the vehicle frame member.

3. The vehicle frame member of claim 1, wherein at least one panel comprises at least two layers of the same material.

4. The vehicle frame member of claim 1, wherein at least one panel comprises at least two layers of at least two different materials.

5. The vehicle frame member of claim 1, wherein a number of layers of material of at least one panel is different from a number of layers of material of other panels.

6. The vehicle frame member of claim 1, wherein at least one material comprises a natural material.

7. The vehicle frame member of claim 6, wherein the natural material is selected from bamboo, hemp, and wood.

8. The vehicle frame member of claim 6, wherein the natural material comprises wood.

9. The vehicle frame member of claim 1, wherein the two or more layers comprise two or more species of wood.

10. The vehicle frame member of claim 1, wherein at least one layer of the two or more layers comprises a man-made material and at least one other layer of the two or more layers comprises a natural material.

11. A polygonal vehicle frame comprising three or more vehicle frame members according to claim 1.

12. The polygonal vehicle frame of claim 11, wherein at least a first vehicle frame member is a first torsion box and at least a second vehicle frame member is a second torsion box;

wherein at least the first torsion box has selected torsional stiffness and axial stiffness that is different from a selected torsional stiffness and axial stiffness of the at least second torsion box.

13. The polygonal vehicle frame of claim 11, wherein the vehicle is a bicycle.

14. A method for constructing a vehicle frame member; comprising:

joining together at least three panels in an arrangement that provides a hollow tube;

wherein each panel of the at least three panels comprises two or more layers of material characterized by values of strength and stiffness along a first axis that are different from values of strength and stiffness along a second axis, high strength to weight ratio, and density of wood;

alternatingly disposing the two or more layers of material of each panel with the first axis oriented at different selected angles relative to a longitudinal axis of the vehicle frame member, and with the second axis oriented at different selected angles relative to the longitudinal axis of the vehicle frame member;

wherein the vehicle frame member exhibits a selected higher torsional stiffness along the longitudinal axis and a selected lower associated axial stiffness along the longitudinal axis according to the selected orientations of the first and second axes of the material.

15. The method of claim 14, wherein at least one material comprises a natural material selected from bamboo, hemp, and wood.

16. The method of claim 14, comprising joining together three or more vehicle frame members to construct a polygonal vehicle frame.

17. The method of claim 16, wherein at least a first vehicle frame member is a first torsion box and at least a second vehicle frame member is a second torsion box;

wherein at least the first torsion box has selected torsional stiffness and axial stiffness that is different from a selected torsional stiffness and axial stiffness of the at least second torsion box.

18. The method of claim 16, wherein the vehicle is a bicycle.

* * * * *